United States Patent
Jenewein

[11] Patent Number: 5,827,468
[45] Date of Patent: Oct. 27, 1998

[54] TURNING CALIBRATION APPARATUS AND PROCESS

[75] Inventor: Hermann Joseph Klaus Jenewein, Muester, Germany

[73] Assignee: E. I. du Pont de Nemours and Company, Wilmington, Del.

[21] Appl. No.: 762,354

[22] Filed: Dec. 9, 1996

Related U.S. Application Data

[60] Provisional application No. 60/013,527 Dec. 19, 1995.

[51] Int. Cl.$^6$ .............................. B29C 47/24; B29C 53/22
[52] U.S. Cl. ....................... 264/508; 264/209.2; 264/310; 264/557; 264/568; 264/569; 425/326.1; 425/336; 425/388; 425/392; 425/396
[58] Field of Search ................................... 264/508, 568, 264/209.2, 562, 209.3, 310, 557, 569; 425/393, 392, 396, 327, 326.1, 336, 388

[56] References Cited

U.S. PATENT DOCUMENTS

| | | | |
|---|---|---|---|
| 3,327,039 | 6/1967 | Ruchert et al. | 425/393 |
| 3,478,390 | 11/1969 | Merritt et al. | 425/326.1 |
| 3,660,000 | 5/1972 | Yoshida et al. | 425/327 |
| 3,692,889 | 9/1972 | Hetrich | 264/508 |
| 3,711,232 | 1/1973 | Van Zon | 425/326.1 |
| 4,017,244 | 4/1977 | Vellani | 425/326.1 |
| 4,038,011 | 7/1977 | Lemelson | 425/396 |
| 4,053,274 | 10/1977 | Lemelson | 264/209.2 |
| 4,292,014 | 9/1981 | Lupke et al. | 425/336 |

FOREIGN PATENT DOCUMENTS

| | | | |
|---|---|---|---|
| 46-40113 | 11/1971 | Japan | 264/508 |
| 47-38072 | 9/1972 | Japan | 264/508 |
| 55-97933 | 7/1980 | Japan | 264/568 |
| 58-220712 | 12/1983 | Japan | 264/508 |

*Primary Examiner*—Jan H. Silbaugh
*Assistant Examiner*—Mark Eashoo

[57] ABSTRACT

Convoluted tubing of thermoplastic resin is made by extruding the resin as a molten tubular extrudate, feeding said extrudate into the interior of a rotating tubular member which has a helical thread in the interior of said member, the spiral thread having a deformation zone receiving the extrudate and a cooling zone downstream from the deformation zone. A vacuum can be used to force the extrudate against the spiral thread in the deformation zone to spirally convolute the extrudate. The rotation of the tubular member causes the resultant convoluted tubing to engage the spiral thread in the cooling zone for conveyance through such zone. Apparatus comprising the rotating tubular member with the interior thread for forming the convoluted tubing is provided.

9 Claims, 2 Drawing Sheets

TURNING CALIBRATION APPARATUS AND PROCESS

RELATED APPLICATION

This application claims the benefit of provisional application Ser. No. 60/013,527 filed Dec. 19, 1995.

FIELD OF THE INVENTION

The present invention concerns a turning calibration apparatus for manufacturing a convoluted tubing of thermoplastic resin.

BACKGROUND OF THE INVENTION

Flexible convoluted polymer tubings are used today for various applications in many technical fields. For example, such tubings may be used as cable conduits, transfer hoses to transport mediums like chemical agents, as well as in the field of energy technology, for example for heat exchanger applications or heating applications, but as well for the conduct of waste-gases of any kind.

Such spiraled, that means convoluted, hoses are currently manufactured in small diameter dimensions up to approximately 40 mm using a turning calibration extrusion process. Suitable are polymers like all thermoplastic resin, including elastomeric modified thermoplasts, as well as modifications of these polymers with various organic and inorganic additives. A typical, known configuration for the performance of a forming process respectively of a turning calibration apparatus for helix polymer tubings is shown in FIG. 3. The Figure shows schematically a cross section of a known configuration. A cooling tubing—guiding tube 31, which carries and guides the convoluted tubing in its interior, is flanged to a medium chamber 42, containing a cooling medium, for example water, in a way that the cooling medium flushes the tubing from the outside. The cooling tube 31 shows perforations 39, which may communicate with the cooling medium 40, such that the convoluted tubing 45 is contacted. The tube 31, which does not revolve, is connected inside the medium chamber 42 by means of a glide sealing joint 35 with a turning calibration tubing piece 32, revolving around the central axis. The turning calibration tubing piece itself is sealed against the medium chamber 42 by means of a sealing ring 34. The cooling tubing 31, mounted fixed to the medium chamber 42, leads through the medium chamber to be connected with a revolving turning calibration at the other side of the medium chamber 42, by means of a glide sealing joint 35. The turning calibration 32 contains a calibration helix, which is shaped in a way to manufacture the desired spiraled form of the convoluted tubing 45. At the periphery of this calibration helix are openings 46 on the outside of the turning calibration tubing piece 32, which also communicate with the cooling medium 40. Vacuum is applied to this cooling medium 40, such that the melt cone 44, which enters the opening of the turning calibration tubing piece 32, is pulled via the calibration helix 33, radially to the outside located openings. Simultaneously the present cooling medium freezes the melt. The such formed tubing is subsequently cooled in the cooling tubing 31 by means of additional cooling openings 39. The convoluted tubing has to be sealed at the exit of the medium chamber 42 against the cooling tubing 31, in order to prevent cooling medium leakage and to maintain the vacuum necessary for the forming process. For this reason, sealing membranes 36 are mounted at the exit of the cooling tubing 31, which show a bore through which the convoluted tubing is pulled through, such that the sealing membranes tightly seal the tubing. In general such sealing membranes consist of a flexible polymer, like silicon rubber. In order to enhance the sealing effect, several membranes are used, which are adjusted to each other by means of spacers 37. In order to overcome the resistance created by these sealing membranes 36 and because this configuration is not self transporting, a haul-off caterpillar apparatus 38 has to be used for the convoluted tubing at the exit of the medium chamber. The caterpillar chain of this configuration is designed in a way to match the periphery of the convoluted tubing to enable its transportation. It is immediately evident, that spiraled tubings, such as convoluted, are difficult to seal. Since this configuration causes permanent leakage, air is continuously sucked over the sealing membranes 36 into the medium chamber 42 which is operated under vacuum. This has adverse consequences on the tolerances of the extrudate, since the vacuum shows strong variations. In particular with large tubing diameters such as ca. 40 mm diameter, the flight depth of the tubing increases, meaning that the leakage rate increases to intolerable values. This known configuration may be used successfully up to maximal tubing diameters of 40 mm and flight depths of 3 mm. Larger tubing diameters are not possible to manufacture with the presented method due to the occurring sealing problems and the resulting pressure variations. Attempts to solve this problem, setting the silicon rubber sealings more tightly, or setting additional sealings sequentially, were unsuccessful, since the increasing resistance against which the extrudate has to be pulled out of the cooling tubing 31, does not allow for a continuous transport anymore due to the accordion effect, which causes an axial oscillation respectively a compression or extension of the spiraled (convoluted) polymer tubing. Compared to a smooth tubing, a convoluted tubing shows at a comparable wall thickness and a comparable polymer type, a much higher crush resistance respectively a much higher inertia due to the form of the spiral. The known equipment has the additional disadvantage, that a further output increase and hence the productivity are not further possible due to the previously described problems.

SUMMARY OF THE INVENTION

The present invention solved the disadvantages of the prior art, in particular trying to realize a reliable solution for a turning calibration apparatus, which allows the manufacturing of large tubing diameters apart from small tubing diameters, very economically. This task is solved according to the invention by the process for forming convoluted polymer tubing from a molten tubular extrudate, comprising feeding said molten tubular extrudate into the interior of a rotating tubular member having an internal helical thread having a deformation zone receiving said extrudate and a cooling zone downstream from said deformation zone, forcing said molten tubulular extrudate into engagement with said spiral thread in the deformation zone thereof to spirally convolute said molten tubular extrudate, and maintaining the resultant convoluted tubing in engagement with said spiral thread in the cooling zone thereof to cool said convoluted tubing, the rotation of said tubular member and the engagement of said spiral thread with said convoluted tubing in said cooling zone transporting said convoluted tubing as it is formed away from said deformation zone and through said cooling zone.

This process for forming the convoluted polymer tubing is capable of producing such tubing in large diameters, e.g. up to 50 cm outer diameter, and small diameters, e.g. as little as 1 cm outer diameter, and avoids the accordion effect obtained when the caterpillar was used remote from the formation of the convoluted tubing. The process is especially useful in making larger size convoluted tubing, having for example an outer diameter of at least 40 mm, preferably at least 50 mm. The spiral convolution of the tubing formed in accordance with the process of the present invention is of course the same as a helical convolution, and the spiral thread forming the convolution is also helical.

Apparatus for carrying out the invention of manufacturing convoluted tubing, comprises an extruder for extruding a molten tubular polymer extrudate, a rotating tubular member positioned to receive said extrudate into the interior of said rotating member, said rotating member having a deformation zone and a cooling zone and an internal spiral thread extending from said deformation zone into said cooling zone, and means for forcing said extrudate into engagement with said spiral thread in said deformation zone to convolute said extrudate, thereby forming said convoluted tubing from said extrudate, the rotation of said tubular member causing said convoluted tubing to engage said spiral thread in said cooling zone to cool said convoluted tubing and transport it away from said deformation zone and through said cooling zone.

The deformation zone in the process and apparatus will also include some cooling of the convoluted tubing being formed, achieved by the molten polymer of the tubular extrudate coming into contact with the spiral thread surface and in addition may receive additional cooling by contact with cooling medium. The cooling zone provides further cooling insuring that the polymer resin of the convoluted tubing is below the melting point of the polymer and also below the temperature at which the convoluted tubing may deform under the influence of the engagement with the spiral thread in the cooling zone. The process and apparatus of the present invention can be used to form convoluted tubing of any thermoplastic resin. The terms resin and polymer are used interchangeably herein.

DETAILED DESCRIPTION OF THE INVENTION

Figure 1:
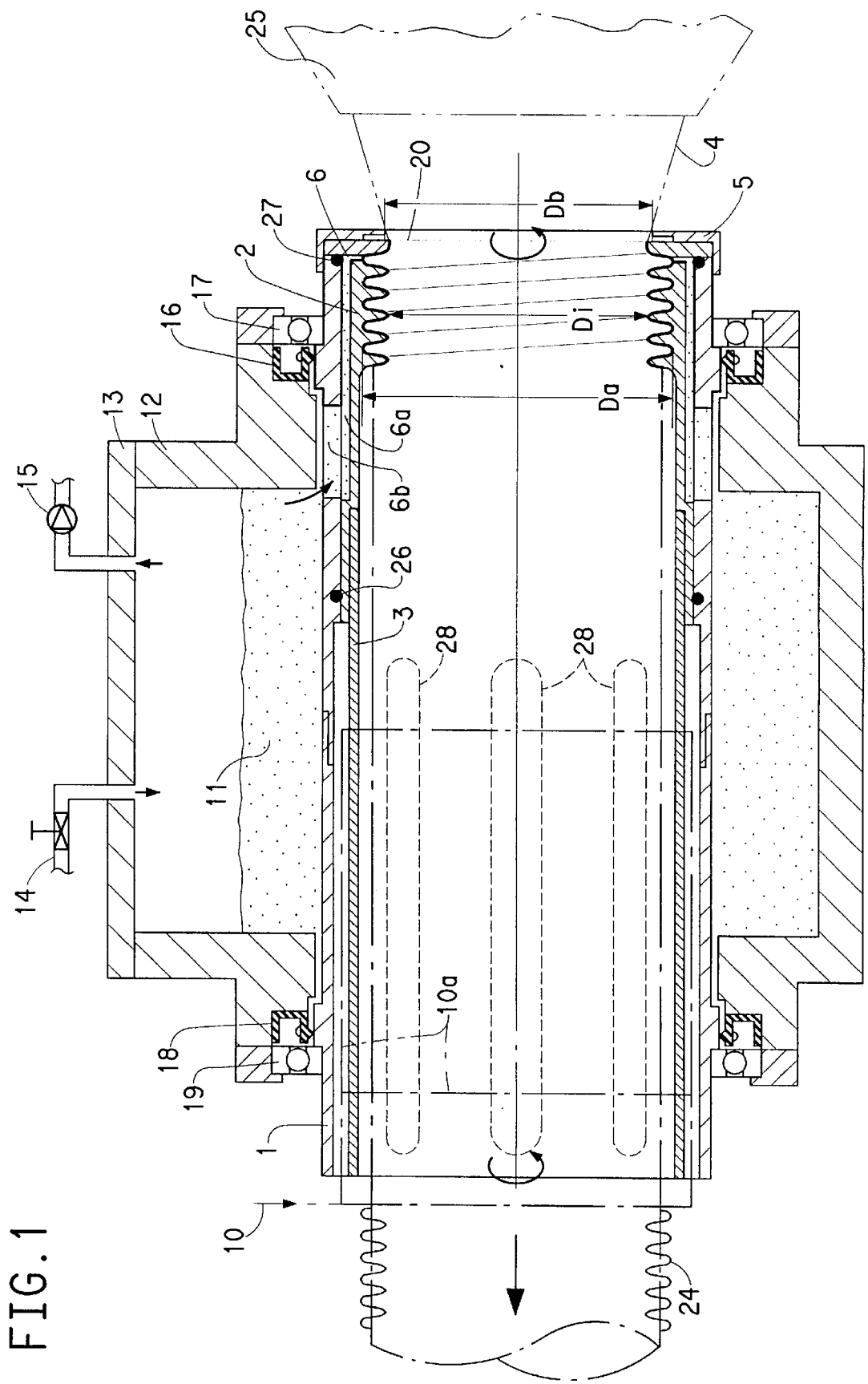
FIG. 1 shows in schematic cross-sectional side elevation one embodiment of apparatus for carrying out the invention.

According to the invention, the task is solved in that a turning calibration is shaped threadlike on its inside, i.e. the spiral thread in the interior of the rotating member, and the molten tubular extrudate is guided in a self sealing manner over this threadlike shape, such that no additional sealing elements become necessary to seal the convoluted tubing at the exit side. The forcing of the molten extrudate against the spiral thread can be obtained by pulling the extrudate towards the thread by means of openings which are supplied with a cooling medium under vacuum, to form the desired spiraled (convoluted) tubing.

Since the convoluted tubing is immediately self-sustaining after the melt deformation due to the high inertia respectively the high crush resistance, the vacuum is only needed for the moment of this deformation in the deformation zone of the spiral thread. Thus, the deformation takes place self sealing, since the soft melt is pulled tightly against the thread under vacuum communicating with the tubing through openings in the thread, along the first thread of the spiral thread where the deformation takes place. Due to the solidification already after the first thread, along a 360° revolving spiral, the tubing is frozen into its shape to become self-sustaining. After the deformation of the melt and the subsequent cooling of the melt below the freezing point of the thermoplastic polymer of which the tubular extrudate is composed, the further threads of the turning calibration serve to further cool and transport the tubing. Based on the revolutions of the calibration and the pitch of the convoluted tubing, the transportation performance equals the product of revolutions times pitch. According to the balanced adjustment of melt temperature, amount of the vacuum necessary for the deformation, as well as the geometry of the thread ring inserted into the turning calibration, the friction between the turning calibration and the extrudate transported by the thread is kept low, to prevent any distortion of the extrudate which would result in an immediate destabilization of the melt entering into the turning calibration. Suitable for the design of the turning calibration are several threads, where 1 to 3 threads are preferred for the deformation zone. Particularly simple and economic is the configuration using only one thread for the deformation. For the transportation, several additional threads are used which may not have any cooling medium openings anymore. This spiraled configuration provides sealing against atmospheric conditions, which allows hardly any leakage of cooling medium. The vacuum may be retained stable, reproducible and without pressure variations. In order to center the entry of the melt cone against the thread and to avoid the possible sucking of ambient air at the entry of the melt into the turning calibration because of asymmetries, a centering ring is set in front of the first pitch. The opening of this ring is in the range between the inner and outer diameter of the convoluted tubing. Preferably this opening corresponds approximately the mean value of the inner—respectively the outer diameter of the tubing. A good distance of the guide—and centering ring from the turning calibration respectively the first thread is in the order of maximum two thread pitches.

In order to provide the application of the cooling medium and in particular the vacuum, openings for the application of media are located along the thread at the outside diameter $D_a$ of the thread (FIG. 1). Such openings should be located in particular along the first and the second thread, however preferably along the first thread. Such openings can be located for example in shape as holes or cut slits in the thread groove, for example up to every 60° distributed along the circumference, preferably however every 30°, whereby very good results are obtained if those are located every 20° or less. To obtain a tight fit (conformation) of the extrudate along the thread surfaces, it is considered advantageous, if the first medium openings are located prior to the beginning of the first thread, as for example in the order of 90° prior to such beginning. If the turning calibration contains several threads, meaning with n times 360° revolution, it is considered advantageous if only the first two threads or even only the first thread are designed as deforming thread and the subsequent threads show for example a steeper flight, meaning that the flight angle is decreased, in order to reduce the friction between turning calibration and the molded convoluted tubing, thus allowing for a good transportation. Preferably the threads are designed with progressively steepening flights as the thread length progresses backwards. The openings in the thread of the turning calibration serve to provide both the exposure of the molten extrudate to cooling medium and to pull the molten extrudate (in the form of a melt cone) over the first forming thread of the spiral thread by means of a vacuum respectively a lower pressure vs. atmospheric pressure. The required vacuum must not be too strong, nor must it show variations. At too high vacuum, the melt would be sucked into the openings to prevent a controlled deformation of the melt. The adjusted pressure at the openings should be at least 0.1 bar (10 kPa) below ambient pressure, which will normally be 100 kPa, whereby even better results are achieved if the pressure is at least 0.2 bar (20 kPa) below ambient pressure. To guarantee reproducible conditions and a flawless forming of the tubing, the pressure variations should be as small as possible, in the order of maximum 0 to ±0.15 bar, whereby very good results are achieved if those are in the order of 0 to ±0.05 bar.

To further optimize the adjustments and to provide an even flow of the melt, the free-standing melt cone, which exits between the extrusion head and the first thread pitch of the turning calibration should preferably be not longer than 100 mm, more preferably however not longer than 40 mm. At too long distances, the cone would sag or be distorted and hence lead to nonuniform results in the forming of the tubing.

The configuration allows for a very high productivity increasing the haul-off speed for the convoluted tubing without adverse consequences on the quality. A further enhancement of the productivity is possible, if the spiraling of the convoluted tubing is designed as a multi-flight helix, meaning several threads are located next to each other, i.e. the spiral thread may consist of one or more spiral threads. When a plurality of spiral threads are present, they are intercalated with respect to one another. Based on this, without broadening the single thread to increase the difficulty of deformation by the first forming thread, the pitch of the total thread can be drastically increased. If for example a convoluted tubing shows a diameter of 130 mm and a flight depth of 6 mm at a pitch of 8 mm (between adjacent threads), using a multi-flight thread, i.e. location of 5 single threads of 8 mm width next to each other, it is possible to provide a pitch of 40 mm per thread of the multi-flight thread. Thus the productivity would be enhanced by a factor 5. For commercial applications which have to be realized at low cost, as for example chimney lining applications, a high productivity at a retained high flexibility of the tubing is imperative. Such high pitches cannot be realized with single flight threads, since the tubing would loose its flexibility to result in kinking.

The apparatus of FIG. 1 is capable of the manufacture of convoluted polymer tubings, including such tubing having larger tubing diameters, such as at least 40 mm.

In the apparatus of FIG. 1, a master tubing 1 (rotatable tubular member) is suspended in revolving mode, powered by a drive unit (not shown). The master tubing 1 which is sealed, leads through a cooling chamber 12 which contains medium 11. The master tubing 1 is suspended at both sides of the medium chamber in bearings 17 and 19 located before and after, respectively, the medium chamber 12. Apart from the bearings 17, 19, shaft sealing rings like for example sealing rings 16 and 18 are mounted at the front and at the back, to seal the outer surface of the master tubing 1, which revolves in the cooling medium. The medium chamber 12 is sealed tight with a cover 13, such that via a vacuum supply tubing leading into the medium chamber 12, a desired vacuum may be generated and retained by means of a vacuum pump 15. The cooling medium 11, preferably water, may be supplied via a medium supply pipe 14.

The master tubing 1 suspends internally in the front (lead) part, the so-called turning calibration 2 in sealing mode. By means of the turning calibration 2 the convoluting tubing 24 (FIG. 2) is formed and transported. The turning calibration 2 shows a thread 20 at the inside, which provides the shape for the forming of the tubing 24. The thread 20, 21, 22 is additionally responsible for the tubing transportation. The tubing 24 itself does not turn with the turning calibration 2 as such is transported according to the revolutions of the apparatus and the pitch of the thread. This is enabled by adjusting the process. The melt cone 4 which leaves the extrusion head 25, is pulled over the first thread 20 onto the surface of the thread shape. At least this first thread is the deformation zone. This is enabled by means of openings 6, located along the groove of the first thread flight connected with the cooling medium being under vacuum. These openings 6 communicate via a pipe 6a with the openings 6b in the master tubing 1, which are supplied with cooling medium 11 and vacuum from the medium tank 12. This means, that the melt 4 is pulled over the thread at the first thread in a way that the melt is deformed and seals tight at the thread 20 while cooling and freezing simultaneously. Already at the second thread respectively the subsequently following threads 21, 22 where further cooling takes place, i.e. the cooling zone, the tubing is solid enough and has slightly (up to several %) shrunk, in order to be transported along the thread without undesired deformation and distortion. The enabling of the combined functions forming, sealing and transporting directly in the turning calibration 2, allows eventually the manufacturing of large tubing diameters in a very economic way. The openings 6, 6a, 6b, may be designed as bores or cut slits. For example grooves may be cut on the turning calibration 2 from the outside to form openings 6a in a way, that the threads 20, 21, 22 are cut at the thread bottom, to provide the desired openings 6, in the order of millimeters. Preferable for the forming is the location of medium supplying openings 6 at the periphery prior the first thread 20. These openings may preferably be located in a range up to 90° prior the beginning of the thread 20 respectively prior the beginning of the thread flight. Such openings 6 beginning prior the first thread and ending after the first thread may be located for example every 60° along the circumference in the thread groove. Preferred is a more even distribution of the openings like for example every 30° or less, whereby preferred every 20° or less.

The turning calibration shows in the example several thread flights, where the first are used for forming. The use of one to three forming threads 20, 21,22 (FIG. 2) is possible to further simplify the configuration. Even at only one forming thread 20 the configuration is still functional, enabling to realize a very simple and economic configuration.

Using several threads 20, 21, 22 it is advantageous if after the first thread 20, the threads increasingly, better progressively become more steep respectively the flight angle becomes smaller. For example, the flight angle may decrease from 30° to 10°, in an extreme case even to 0°. This facilitates the transportation, since the demoulding is additionally helped by freezing—and shrinking processes, and such the friction between tubing and turning calibration is reduced. Thus, distortion of the tubing may be safely prevented.

To obtain constant and precise results of the forming, it is advantageous if the melt cone 4 is lead centrally into the opening of the turning calibration 2. The melt cone preferably has a distance of maximal 100 mm, more preferably maximal 40 mm, between the first thread and the exit 25 of the extrusion head. Therefore a centering ring 5 should be placed in front of the first thread 20. The ring 5 should have a circle like opening, whose diameter $D_b$ should be in the range between the inner thread diameter $D_i$ and the outer thread diameter $D_a$. Best results are obtained at a diameter, which is centrally located between these two diameters. The distance of the ring vs. the beginning of the thread should not exceed an order of up to 2 pitches.

The whole system is preferably designed, so that a pressure of at least one 0.1 bar below ambient pressure is applied at the aspiration openings 6 which is kept possibly constant. Even better if the pressure is at least 0.2 bar below ambient pressure and may even be as low as 0.4 bar below ambient pressure, but the vacuum should not be so high as to cause boiling of the cooling medium. The pressure variations should be maximal in the order of 0±0.15 bar. At larger variations the tubings can't be formed anymore or they show unreproducible, undesired deformations. The solution according to the invention allows to keep pressure variations in the range of 0 to ±0.05 bar, which provides for high qualities and output rates. As of pressure variations, greater than ±0.3 bar the form stability of the tubing becomes poor, for example dimensional deviations of more than 2% occur, resulting in scrap production. At pressure variations below ±0.15 bar, the result improves immediately, the maximal tolerance deviations are then in the order of 1 to 2%. If the pressure variations are below ±0.05 bar, the tolerance deviations are less than 1% providing the desired precision. The tolerance aim for applications of convoluted polymer tubings is always better than 1%.

As an option for particularly high output rates, the turning calibration 2 may be designed such that several threads are located next to each other. This results in a multi-flight thread, where the main pitch may be multiplied by the number of individual threads located next to each other. Thus the productivity may be drastically enhanced, retaining the high flexibility by means of a sufficiently narrow spiraling of the tubing. An extended thread (long thread pitch) would result in an unflexible tubing, susceptible to kincking.

As a further possibility to reduce the friction between the tubing and the calibration thread, the thread may be designed slightly conical, opening backwards. In most of the cases configurations with progressively increasing steepness of the flights, is considered sufficient.

In addition, the turning calibration apparatus according to FIG. 1 shows in prolongation to the turning calibration a guiding tube 3, which has the function to guide the finished convoluted tubing along the inside, out of the configuration and to cool it additionally. The guiding tube 3 revolves therefore concentrically with the master tubing 1 together with the turning calibration 2 around the longitudinal axis of the configuration. The guiding tube 3 is located such, that it is somewhat distant from the master tubing 1 to provide room for the cooling shower 10, 10a, located between them. The shower is stationary and for example designed with perforated tubings 10a located around the guiding tube 3, which spray for example cooling water against the turning guiding tube 3. The cooling water wets the convoluted tubing 24 by means of perforated slits 28, located in the guiding tube. The guiding tube 3 is atmospherically freely accessible, since the medium separation, in particular the separation from the vacuum of the turning calibration 2 is provided by the seal rings 26, 27.

The whole configuration may be designed shorter, if for example less threads are foreseen. In that case for example a one-sided bearing suspension of the now short master tubing 1 is sufficient, which enables a further cost reduction of the apparatus.

Figure 2:
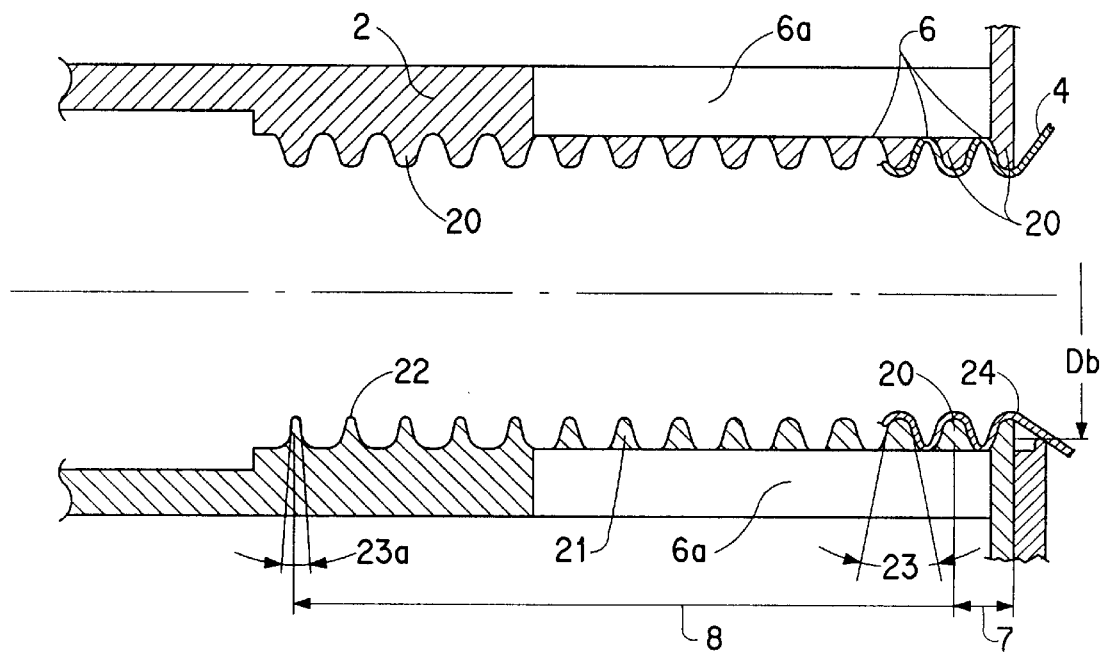
FIG. 2 shows in enlargement a schematic cross-sectional side elevation of a turning calibration which incorprates two embodiments of spiral thread in the upper and lower portion of the Fig., either of which embodiments can be used in the apparatus shown in FIG. 1.
Figure 3:
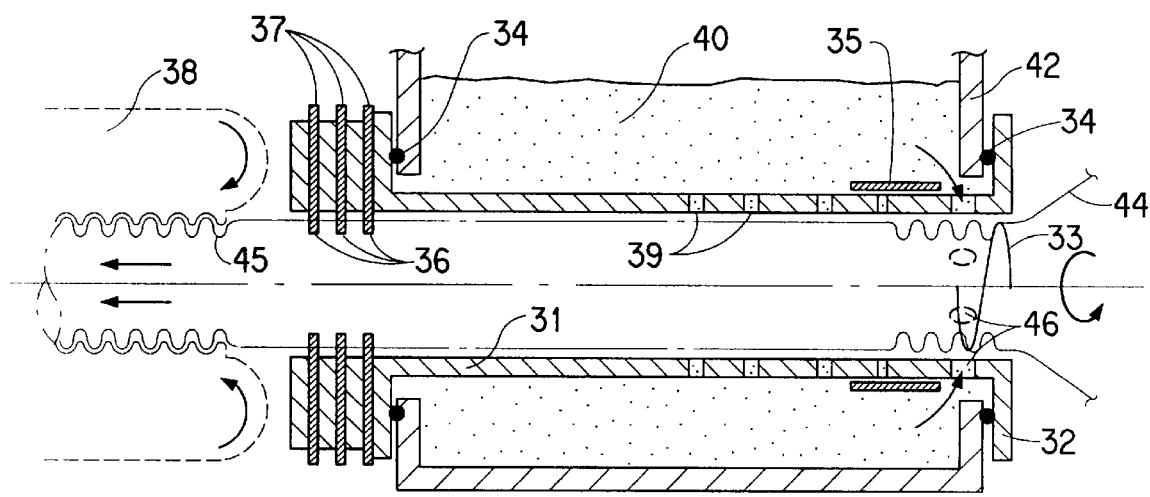
FIG. 3 shows in cross-sectional side elevation Prior Art apparatus for making convoluted polymer tubing, over which the present invention is an improvement.

In FIG. 2 a cross section shows schematically and as an example an enlarged turning calibration insert 2. The upper half of the axis shows a uniform calibration thread with a total of 12 threads. The first eight forming threads are machined from the outside with grooves 6a, so that at the bottom of the thread, openings 6 are provided which then communicate with the cooling medium which is under vacuum. The melt cone 4 is being put onto the first thread in a deforming and sealing manner. As mentioned already, it is generally sufficient, if only a few threads, for example 1 to 3 are provided with aspiration openings 6. Preferably only one thread may be provided with openings 6, whereby those should begin already prior to the first thread flight. The subsequent threads take on the transportation function. Therefore, ca. 4 to 10 threads should be foreseen, depending on the operating revolution speed. At high revolution speed, more threads are required compared to low revolution speed.

In the lower part of the axis, a thread example is shown, where the thread flight becomes backwards progressively steeper with each revolution. For example, the front flight angle 23 is designed to have 30° and the backward flight angle 23a is designed to have 10°. The backward flights may even be designed steeper, similar to a trapezoidal thread. The progressive flight change may also only take place after the first forming threads which are showing the medium openings 6. The different working zones are also shown schematically. The forming deformation zone 7 starts at the entry to the first thread 20. The first thread is therefore determining. Here sealing takes place immediately by melt deformation. A kind of a transition zone constitutes the subsequent freezing and transportation zone 8. Here further cooling takes place in the front part 7, where medium openings 6 are present, whereby simultaneous transportation of the thread contacting the convoluted tubing, particularly in the backward thread section takes place.

By means of the described apparatus, more than 1000 m of convoluted polymer tubings at high output rate and highest quality, were produced. The tubing outer diameter $D_a$ was 132 mm at a flight depth of 6 mm and a pitch of 8 mm. The required tolerance of better than 1% was attained without any problem. Over the total 1000 m, typically less than 0.5% tolerance deviation was measured. This tubing was made of fluorocarbon resin, particularly copolymer of tetrafluoroethylene with perfluoropropylvinyl ether, although such resins as tetrafluoroethylene copolymer with hexafluoropropylene or ethylene can be used as well as non-fluorocarbon resins such as polyethylene and polypropylene.

I claim:

1. Process for manufacturing convoluted polymer tubing from a molten tubular extrudate of said polymer, comprising feeding said molten tubular extrudate into an interior of a rotating tubular member having a deformation zone and a cooling zone downstream from said deformation zone and an internal spiral thread extending from said deformation zone into said cooling zone, said spiral thread receiving said molten tubular extrudate at an entrance to said rotating tubular member, vacuum forcing said molten tubular extrudate against said spiral thread in the deformation zone of said rotating tubular member to spirally convolute said molten tubular extrudate, and maintaining the resultant convoluted polymer tubing engaged with and in sealing relationship with said spiral thread in said deformation zone and said cooling zone of said rotating tubular member, and contacting said convoluted polymer tubing in said sealing relationship with cooling medium through openings in said spiral thread communicating with a chamber of said cooling medium to cool said convoluted tubing, the rotation of said rotating tubular member and the engagement of said spiral thread with said convoluted tubing in said cooling zone transporting said convoluted tubing as it is formed away from said deformation zone and through said cooling zone.

2. The process of claim 1 wherein said vacuum forcing is obtained by exposing said extrudate in said deformation zone to a vacuum through said spiral thread.

3. The process of claim 2 wherein said vacuum is at least 0.1 bar.

4. The process of claim 2 wherein said vacuum is steady at ±0.15 bar.

5. The process of claim 1 wherein said polymer is fluorocarbon resin.

6. Apparatus for the manufacture of convoluted. tubing of thermoplastic resin, comprising an extruder for extruding a molten polymer extrudate, a rotating tubular member positioned to receive said extrudate into an interior of said rotating member, said rotating member having a deformation zone and a cooling zone and an internal spiral thread extending from said deformation zone adjacent said extruder into said cooling zone, and vacuum means for forcing said extrudate into engagement with said spiral thread in said deformation zone to convolute said extrudate, thereby forming said convoluted tubing from said extrudate, rotation of said tubular member causing said convoluted tubing to engage said spiral thread in said cooling zone to cool said convoluted tubing and transport it away from said deformation zone and through said cooling zone, a chamber of cooling medium, said spiral thread in said deformation zone having openings in an outer diameter of the thread for communicating vacuum from said vacuum means with said extrudate through said openings to accomplish said forcing of said extrudate into engagement with said spiral thread, said spiral thread in said cooling zone having openings in the outer diameter of the thread communicating with said chamber of coating medium to permit contact of said cooling medium with said convoluted tubing to obtain cooling of said convoluted tubing in said cooling zone, said convoluted tubing being in sealing relationship with said spiral thread containing said openings in said deformation zone and in said cooling zone.

7. Apparatus according to claim 6 characterized in that said spiral thread consists of more than one thread.

8. Apparatus of claim 6, wherein said vacuum is at least 0.1 bar below ambient pressure.

9. Apparatus according to claim 1 characterized in that said spiral thread in said cooling zone has a steeper flight than said spiral thread in said deformation zone.

* * * * *